3,595,801
AQUEOUS DISPERSIONS OF MIXTURES OF BENZOXAZOLE DERIVATIVES AND THEIR USE AS OPTICAL BRIGHTENERS
Günter Rösch, Altenhain, Taunus, Otto Smerz, Kelkheim, Taunus, and Erich Schinzel, Hofheim, Taunus, Germany, assignors to Farbwerke Hoechst Aktiengesellschaft vormals Meister Lucius & Bruning, Frankfurt am Main, Germany
No Drawing. Filed Dec. 9, 1968, Ser. No. 782,478
Claims priority, application Germany, Dec. 29, 1967,
P 15 94 855.7
Int. Cl. D06l 3/12
U.S. Cl. 252—301.2      9 Claims

ABSTRACT OF THE DISCLOSURE

A mixture of 1,4-naphthalene-bis-(2'-benzoxazoles) and of p-substituted 2-styryl benzoxazoles in the form of an aqueous dispersion shows a higher brightening effect on fibrous materials which are, at least partially, of synthetic origin, than the two components. The two components are used in a ratio of 0.1 to 10 parts by weight of styryl benzoxazole per each part by weight of naphthalene derivative.

---

The present invention relates to aqueous dispersions of mixtures consisting essentially of a compound of the formula

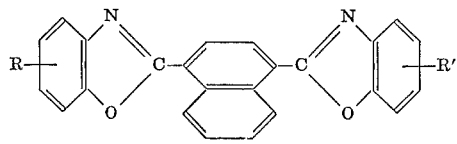

in which R and R' represent hydrogen, carboxy or carbo-lower-alkoxy, and a compound of the formula

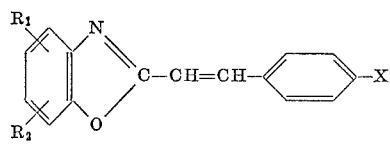

in which X is cyano, carboxy or carbo-lower-alkoxy and $R_1$ and $R_2$ are hydrogen, lower alkyl or together lower alkylene.

A further object of this invention is the use of said dispersions as optical brightening agents for fibrous materials which are, at least partially, of synthetic origin.

1,4-bis-(benzoxazolyl-(2'))-naphthalene and its substitution products are already known as optical brighteners. For example, Belgian Pat. No. 663,227 discloses the use of aqueous dispersions of those compounds as optical brighteners for fabrics made of polyethyleneglycol-terephthalate fibers. Known optical brighteners are, moreover, for example 2-(p-cyano- or carbalkoxy-styryl)-benzoxazoles which may carry various substituents in the benzene nucleus. The use of aqueous dispersions of those optical brighteners is for example, disclosed in detail in U.S. Pat. No. 3,262,929. The known products do, however, not meet all the requirements of practice in regard to the desired degree of whiteness.

It has now been found that aqueous dispersions prepared from mixtures of a compound of Formula I

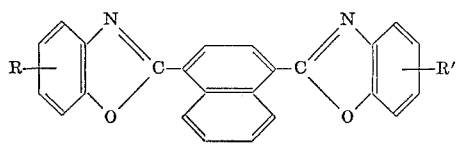

in which R and R' stand for hydrogen, a carboxy group or a carboxy group that is esterified with a lower alcohol having up to 4 carbon atoms, and a compound of Formula II

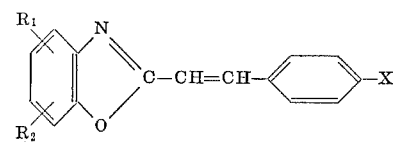

in which X stands for a cyano group or, preferably, a carboxy group or a carboxy group that is esterified with a lower alcohol having 1 to 4 carbon atoms, and $R_1$ and $R_2$ stand for hydrogen, lower alkyl groups having 1 to 4 carbon atoms, or together form a condenser 5- or 6-membered hydroaromatic carbocyclic ring, are excellently suitable as optical brighteners for use in fibrous materials made entirely or partially from synthetic fibers. These mixtures are distinctly superior to the components which constitute them, in their brightening effect as regards the brilliance of whiteness as well as the ratio of concentration to effect obtained. Thus, these mixtures exhibit an unexpected synergistic effect.

This surprising phenomenon which consists in that the brightening effect of the dispersed mixture of the two compounds of Formulae I and II is substantially more favorable than that of the dispersions of the separate components, could be established especially in fibrous materials made of linear polyesters but also in other synthetic fibers such as polyamides and polyacrylonitrile. Good results are also obtained using these mixtures in blended fabrics made from linear polyesters and other synthetic or natural fibers, especially fibers containing hydroxy groups, in particular cotton.

The mixtures of the invention exhibit a substantial superiority to the separate components which constitute them, even when applied by the most different methods. This applies to exhausting methods carried out at a temperature of from 80 to 140° C. with or without the user of carriers as well as to the thermosoling method wherein the fibrous material is immersed in a bath containing the brightening dispersion, then squeezed off to a moisture content of from 20 to 100% and finally treated at a temperature of from 140 to 240° C.

The materials brightened with the mixtures of the invention practically show the same fastness to light as the separate components which constitute these mixtures.

The indicated synergistic effect covers a wide range of mixing of the compounds I and II. As the examples will disclose in detail, the degree of whiteness and the yield can be increased, in comparison with the separate components, by mixing 1 part by weight of compounds I with 0.1 part of compounds II or 1 part of compounds II with 0.1 part of compounds I, preferably 1 part by weight of compound I with 0.5–1.5 parts by weight of compounds II.

The dispersions are prepared with the help of the usual dispersing and stabilizing agents, for example oxethylated alkylphenols such as oxethylated nonylphenol, or di-(methoxy-methyl)-anisole, furtermore partially hydrolized polyvinyl acetates having a different chain length and a different residual content of polyvinyl acetate.

The grinding devices to be used for producing well-dispersible products may be ball mills, colloid mills, bead mills or dispersion kneaders. It is also possible to disperse the individual components separately with the indicated dispersing agents and to mix them in dispersed form.

The final dispersion advantageously has the following composition (in percent by weight):
5–10% of compound I
5–10% of compound II
5–20% of dispersing agent (and other auxiliaries) and
60–85% of water.

The following examples illustrate the invention, but they are not intended to limit it thereto, the parts and percentages being by weight unless otherwise stated.

EXAMPLE 1

A bleached fabric made of polyethyleneglycol-terephthalate fibers is treated at a goods to liquor ratio of 1:20 in a bath containing, in dispersed form, 0.05 g./l. of a mixture comprising 1 part of compound III

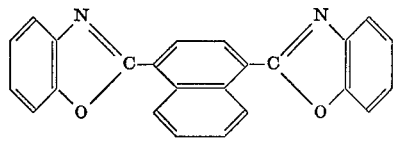

III and 1 part of compound IV

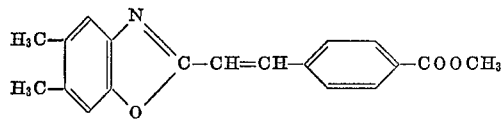

IV

The bath is allowed to act upon the material at 120° C. for 45 minutes. Then the material is rinsed and dried in usual manner.

The fibrous material thus treated shows a high degree of whiteness that apperas substantially more brilliant than that produced under the same conditions by dispersions containing 0.05 g./l. each of the separate components of the indicated mixture.

The dispersion indicated in Example 1 may be prepared as follows:

The compounds III and IV are roughly mixed at the indicated ratio and the mixture is introduced into about twice the amount of water containing as dispersing agent a mixture of equal parts of an addition product of 20 mols of ethylene oxide on 1 mol of nonylphenol, of a condensation product of phenol and 4 mols of formaldehyde, methylated by dimethylsulfate, as well as of a partially hydrolized polyvinyl acetate (K-value 50). The mixture is finely ground in a bead mill until about 50% of all the particles have a size of about 1 μ. and then water is added thereto until a concentration of about 10% is reached, calculated on the brightening mixture.

EXAMPLE 2

A fabric made of polyethyleneglycol-terephthalate fibers is treated at a goods to liquor ratio of 1:20 in a bath containing 1 g./l. of sodium chlorite and, in a dispersed form, 0.07 g./l. of a mixture comprising 9 parts of compounds III (Example 1) and 1 part of compound V

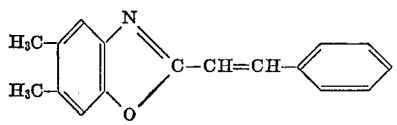

—COO—CH$_2$—CH$_2$—CH$_2$—CH$_3$

V

The pH-value of the bath is adjusted to 3.5 by means of formic acid and the fibrous material is, at first, treated for 2 hours at 80° C. and, subsequently, for 45 minutes at 120° C. under pressure. After rinsing and drying, the fibrous material shows a very high degree of whiteness that has a more neutral and, thus, more pleasant appearance than that produced under the same conditions by dispersions containing 0.07 g./l. of the separate components of the indicated mixture.

EXAMPLE 3

A bleached fabric made of polyethyleneglycol-terephthalate fibers is treated at a goods to liquor ratio of 1:30 in a bath containing, in dispersed form, 0.03 g./l. of a mixture comprising 2 parts of compound VI

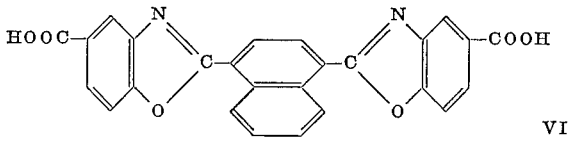

VI and 8 parts of compound VII

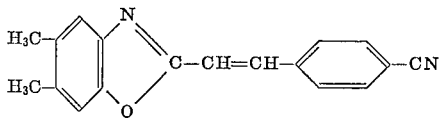

VII as well as 2 g./l. of benzoic acid methyl ester as a carrier. The fabric is treated for 30 minutes at 100° C. and, after rinsing and drying, a degree of whiteness is achieved which is more neutral than that produced with the use of dispersions having the same concentration of the separate components of the indicated mixture.

EXAMPLE 4

A bleached fabric made of polyethyleneglycol-terephthalate fibers is impregnated with a dispersion containing 1 g./l. of a mixture comprising 4 parts of compound III (Eaxmple 1) and 6 parts of compound VIII

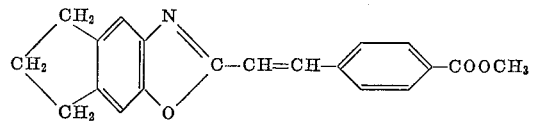

VIII

The fibrous material thus treated is squeezed off between cylinders until its moisture content is only 60% of its dry weight and then it is treated for 30 seconds in hot air of 200° C.

The fabric thus treated has an excellent degree of whiteness which is higher than that produced under the same conditions by dispersions containing 1 g./l. of the separate components of the indicated mixture.

EXAMPLE 5

A fabric made of polyamide fibers of the type nylon 6 is impregnated with a dispersion containing 1 g./l. of a mixture comprising 7 parts of compound III and 3 parts of compound IV (both of Example 1). The fibrous material thus impregnated is squeezed off between cylinders until its moisture content is only 50% of its dry weight and, subsequently, it is treated for 30 seconds in hot air of 190° C.

The fabric thus treated shows an excellent degree of whiteness which is substantially more brilliant than that produced under the same conditions by the dispersions containing 1 g./l. of the separate components of the indicated mixture.

EXAMPLE 6

A fabric made of polyacrylonitrile fibers is treated in a goods to liquor ratio of 1:40 with a bath containing 1 g./l. of sodium chlorite and, in dispersed form, 0.025 g./l. of a mixture comprising 1 part of compound VI (Example 3) and 9 parts of compound VII (Example 4). The pH-value of the bath is adjusted to 3 by means of formic acid. Bleaching is effected within 2 hours at 80° C. and the fabric is subsequently heated to 100° C. for 30 minutes.

After having been rinsed and dried the fibrous material shows a very high degree of whiteness which is substantially more neutral and, thus, of a more pleasant appearance than that produced under the same conditions by dispersions containing each 0.025 g./l. of the separate components of the indicated mixture.

We claim:

1. An optically brightening aqueous dispersion which comprises water and a mixture that consists essentially of about 0.1 part to about 10 parts by weight of a brightening compound of the formula

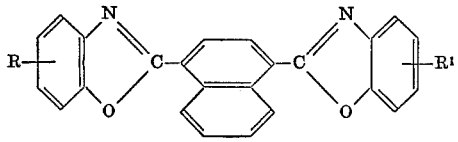

in which R and $R^1$ each is hydrogen, carboxy or carbo-lower-alkoxy, and about 1 part by weight of a brightening compound of the formula

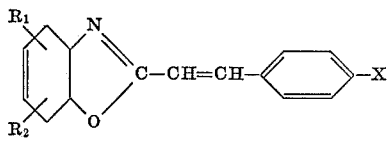

in which $R_1$ and $R_2$ each is hydrogen or lower alkyl or together are lower alkylene, and X is cyano, carboxy or carbo-lower-alkoxy.

2. An optically brightening dispersion according to claim 1 which further contains a dispersion agent for said brightening compounds.

3. An optically brightening dispersion according to claim 2 wherein said dispersion contains from about 5% to about 10% by weight of each of said brightening compounds, from about 5% to about 20% by weight of said dispersing agent, and from about 60% to about 85% of water.

4. An optically brightening dispersion according to claim 1 wherein said brightening compounds are

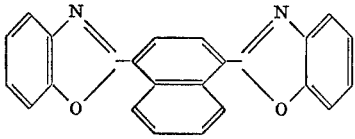

and

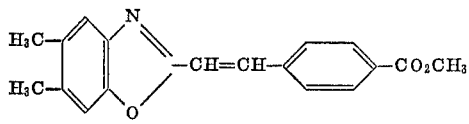

5. An optically brightening dispersion according to claim 4 wherein the second of said brightening compounds is present in an amount of about 0.5 part to about 1.5 parts per part of the first of said brightening compounds.

6. A composition of matter consisting essentially of water, a dispersing agent, about 0.1 part to about 10 parts by weight of a brightening compound of the formula

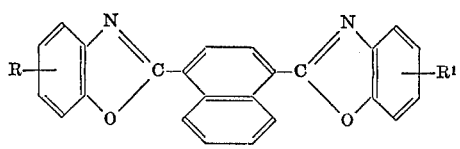

in which R and $R^1$ each is hydrogen, carboxy or carbo-lower-alkoxy, and about 1 part by weight of a brightening compound of the formula

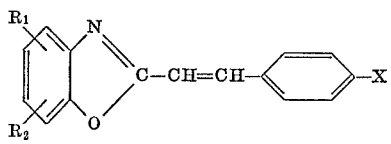

in which $R_1$ and $R_2$ each is hydrogen or lower alkyl or together are lower alkylene, and X is cyano, carboxy or carbo-lower-alkoxy.

7. A composition of matter according to claim 6 that contains from about 60% to about 85% of water, from about 5% to about 20% of said dispersing agent, and from about 5% to about 10% of each of said brightening compounds.

8. A composition of matter according to claim 6 wherein said brightening compounds are

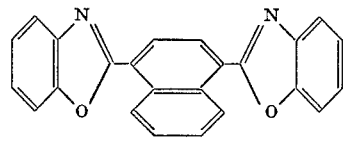

and

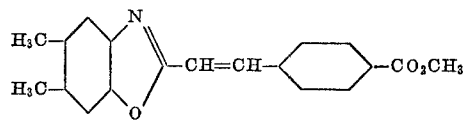

9. A composition of matter according to claim 8 which contains from about 0.5 part to about 1.5 parts of the second of said brightening compounds per part of the first of said brightening compounds.

References Cited

UNITED STATES PATENTS

| | | | |
|---|---|---|---|
| 3,336,330 | 8/1967 | Schinzel et al. | 260—307 |
| 3,366,575 | 1/1968 | Ono et al. | 252—301.2 |
| 3,416,945 | 12/1968 | Zweidler et al. | 117—33.5 |
| 3,366,630 | 1/1968 | Schinzel et al. | 260—240 |

TOBIAS E. LEVOW, Primary Examiner

A. P. DEMERS, Assistant Examiner

U.S. Cl. X.R.

117—33.5